United States Patent [19]  [11]  4,176,115
Hartman et al.  [45]  Nov. 27, 1979

[54] FIRE-RESISTANT CONSTRUCTION MATERIAL

[75] Inventors: Seymour Hartman, Mahopac; Catherine M. Sheridan, Pawling, both of N.Y.

[73] Assignee: Champion International Corporation, Stamford, Conn.

[21] Appl. No.: 794,368

[22] Filed: May 6, 1977

Related U.S. Application Data

[63] Continuation of Ser. No. 613,476, Sep. 15, 1975, abandoned.

[51] Int. Cl.$^2$ .......................... C08K 3/32; C08K 3/34; C08K 5/17; C08K 5/05
[52] U.S. Cl. .............................. 260/39 R; 260/395 B; 428/921
[58] Field of Search ........ 260/39 R, 39 SB, DIG. 24, 260/29 R; 428/921

[56] References Cited

U.S. PATENT DOCUMENTS

| | | | |
|---|---|---|---|
| 2,600,455 | 6/1952 | Wilson et al. | 260/6 |
| 3,008,926 | 11/1961 | Reuter et al. | 260/39 R X |
| 3,037,951 | 6/1962 | Basto et al. | 260/39 R X |
| 3,789,041 | 1/1974 | Talsma | 260/39 R X |
| 3,792,020 | 2/1974 | Huck et al. | 260/39 R X |
| 3,934,066 | 1/1976 | Murch | 428/921 X |
| 3,955,987 | 5/1976 | Schaar et al. | 260/DIG. 24 |

*Primary Examiner*—Sandra M. Person

[57] ABSTRACT

A fire-resistant construction material is disclosed. This construction material is composed of an incombustible component, ordinarily including flame-retardant and intumescent agents, intimately dispersed and fixed into a rigid panel by a binder of melamine formaldehyde resin.

10 Claims, No Drawings

FIRE-RESISTANT CONSTRUCTION MATERIAL

This is a continuation of application Ser. No. 613,476 filed Sept. 15, 1975, and now abandoned.

BACKGROUND OF THE INVENTION

Numbers of fire-resistant construction materials are known and in common use. These construction materials are normally available in panel, preferably rigid panel, form so as to be useful as, or as a substantial portion of, common building parts.

These construction materials are relied upon to impart fire-resistance or fire-proofing in buildings and commonly replace, or partially replace, wood and similar flammable construction materials. Thus, for example, fire-resistant construction materials may be provided in panel form so as to constitute the structural facing of walls, ceilings, doors and the like.

It is also known to face these fire-resistant construction materials with a laminate, paint, or other cosmetic coating which may itself be either flammable or inflammable. In instances where a flammable facing or coating is applied to these fire-resistant construction materials, the construction materials serves as a fire-resistant barrier which provides insulation or separation of flammable building materials and thus also serves as a means of avoiding spread of flames in the event of fire.

A common example of the use of fire-resistant construction materials as a portion of a building material is in the core of a door. Such a construction is exemplified by U.S. Pat. No. 3,196,494 of Hartman et al, the disclosure of which is incorporated herein by reference. In such a door, the fire-resistant construction material constitutes its main structural support. The construction material itself need not be apparent, however, as it may be covered with, for example, a thin veneer of wood to give the appearance that the door is solid wood. Unlike solid wood, however, the door will not burn and will serve as a barrier for any fire which might occur on one side or the other.

One of the most common fire-resistant construction materials now in use comprises panels of a mixture of cement and asbestos. In such materials, the cement acts largely as an inert binder for the incombustible component, asbestos. Such construction materials, however, have serious disadvantages in use. They are extremely brittle and require special care in handling. Also, they cannot be nailed directly due to their poor impact strength. Accordingly, pre-drilling of holes is a necessity. Moreover, special tools must ordinarily be used to cut the panels and special molding, where they are mounted or otherwise fixed in position.

In Canadian Pat. No. 897,855 of Hartman, there is disclosed an improvement to the cement binder fire-resistant construction materials. That Canadian Patent describes structures in which incombustible components are dispersed and fixed into rigid panels with a two-part binder consisting of phenol formaldehyde resin and urea formaldehyde resin. Significantly, that invention overcomes many of the problems of special handling, brittleness, and low impact strength of fire-resistant construction materials containing cement.

Even the two-part binder system of this Canadian patent has not, however, met with complete success. In particular, the preparation of rigid panels from the fire-resistant construction material there described must be performed within a short period of time because of the limited pot life of the resin composition. Further, because water is required for the formation of such construction materials, difficulties with surface migration of salts such as certain incombustible components in the material have been encountered during the curing of the resin into a fixed panel. This migration may lead to an eventually heterogeneous composition and, by virtue of the surface location of such salts, may result in a panel in which important incombustible components may be only lightly bound and therefore are susceptible to loss through abrasion.

INTRODUCTION TO THE INVENTION

It is an object of this invention to provide fire-resistant construction material in the form of rigid panels of improved physical properties which may be handled as if they were made of wood.

It is a further object of this invention to provide fire-resistant construction materials comprising an incombustible component intimately dispersed and fixed into a rigid panel by an organic resin binder which can be produced from a stable dry particulate powder. It is desired that the admixture powder, once prepared, may be formed into a rigid panel whenever desired and without concern of premature setting.

Still another object of this invention is a stable, articulate powder which may be formed into a rigid panel of fire-resistant construction material in the absence of water so as to eliminate the migration of powder constituents during curing and ensure the homogeneity of the resultant panel.

These objects, and further advantages as are described herein, are obtained by the present invention.

DESCRIPTION OF THE INVENTION

This invention revolves about the use of melamine formaldehyde resin as a binder in fire-resistant construction material. More particularly, it has been discovered that melamine formaldehyde resin may be admixed with a particulate, incombustible component for fire-resistant construction materials and that this blend of intimately dispersed powder may then be fixed into a rigid panel by curing the resin.

The cured and resin-bound panels of this fire-resistant construction material exhibit unusually desirable properties. They may be handled in much the same manner as ordinary lumber. Thus, for example, they may be directly nailed, drilled, painted, laminated and otherwise treated in the same manner as if they were a wood construction material. In contrast to these woody materials, however, the present resin-bound panels exhibit fire-resistance and, if desired, improved intumescent properties so as to provide substantial protection in the event of fire.

The present fire-resistant construction materials may be formed by curing a powdered blend of the dry melamine formaldehyde resin with suitable incombustible components as are known in the art for their properties of fire-resistance. Curing of the melamine formaldehyde resin—which step fixes the powdered precursor of the present construction material into a rigid panel—may be simply performed. All that is necessary is that sufficient pressure and temperature be applied to the blend to transform it into a rigid, continuously adherent network.

Suitable conditions for curing of the resin-containing blend are temperatures of at least about 250° F., preferably from about 300° to 400° F., and pressures of at least about 25 psi, preferably from about 50 to 200 psi. Under these conditions, the powder rapidly cures into a rigid panel. At least five minutes and preferably from about 10 to 20 minutes at these temperatures and pressures are ordinarily desired in order to ensure complete curing of the resin throughout the resultant panel.

Conditions of curing within the foregoing parameters are most conveniently obtained through the use of a hot press. Thus, for example, the precursor blend of resin and incombustible components may be fed into a suitably configured mold such as a caul having a peripheral frame which prevents the spread of the powder. Thereafter, a second caul may be applied to the top of the powder opposite the first caul to completely enclose the powdered blend. The cauls may then be heated and forced together to press the blend for a period of time sufficient completely to cure the resin. After, for example 20 minutes, a rigid panel of the cured resin and incombustible component can then be removed from the press.

It has been discovered that the amount of melamine formaldehyde resin necessary for formation of an integral rigid panel may vary dependent upon the structural use ultimately intended. Panels which will assume little stress—for example, panels which are intended to be used only as the surface of ceilings or ones which will ultimately be laminated with strong coating materials—need contain only a minor component of the resin. On the other hand, where the panel is intended for uses involving substantial stress—as in the construction of a door—greater amounts of the resin ordinarily prove desirable. Accordingly, the amount of resin in the present fire-resistant construction material ordinarily ranges from about 30% to 70%, preferably from about 40% to 55%, by total weight. Even within these ranges, however, modification may be made dependent upon the desired strength of the ultimate panel.

The strength of the present panels may also be varied by other means. Thus, for example, it has been found that variation in the pressure of curing within the foregoing ranges affects this property. This may easily be measured because the density is correspondingly altered. Preferred density products are from 30 to 60 pounds per cubic foot, with about 40 pounds per cubic foot being most desired.

In addition to the resin, the panels of this invention include an incombustible component. This component, which is intimately, and preferably homogeneously, dispersed throughout the product panel, may be composed of various fire-resistant and fire-retardant constituents well-known in the art to provide fire-resistance. The incombustible component is ordinarily about 30 to 70%, preferably 45 to 60%, by total weight of the fire-resistant construction material.

One class of constituents useful in the combustible component is the non-flammable inorganic minerals well-known in the art. Minerals such as asbestos, perlite or other silicous materials are known to be useful both because they are essentially completely inflammable and because of their ability to provide heat insulation. Thus, in addition to erecting a physical barrier to the spread of flames, they also provide free protection by diminishing the transfer of heat through the present construction material. Minerals belonging to this class are customarily utilized in the present fire-resistant construction materials in amounts up to 40% by total weight. More preferably, they are used in combination with other incombustible components and constitute from about 10 to 30% by total weight of the construction material.

Among the other constituents useful in the incombustible component of the present construction materials are intumescent agents. These intumescent agents are also well-known in the art and comprise, for example, ammonium phosphate and pentaerythritol. These agents, which may be present in an amount up to about 30%, ordinarily from about 10 to 20% by total weight, increase the fire-resistance of the present construction materials through swelling or foaming upon exposure to high temperature. Thus, for example, upon exposure to flame, these agents produce an insulating char which provides further fire-resistant protection.

In addition to the foregoing constituents which may be present in the incombustible component of the present fire-resistant construction material, many other desirable fire-resistant or fire-retardant agents are useful. These agents are, however, well-known in the art. Accordingly, their selection and optional inclusion within the fire-resistant construction materials of this invention are readily available within the ordinary skill in the art and they are not further discussed herein.

In selecting these and other agents, however, it is desired to minimize or avoid inclusion of liquids and particularly aqueous liquids. This is done to prevent salt migration during curing. Thus it is preferred that the blend (including the melamine formaldehyde resin) be essentially anhydrous so as to ensure homogeneity in the product fire-resistant construction material.

The present invention will be more apparent from the following examples which are chosen from the many specific combinations possible. They are intended to illustrate this invention and are not limitative of its scope.

EXAMPLE 1

A blend of incombustible components and resin was prepared in a ribbon blender. The blend was composed of the following components:

| INGREDIENTS | TOTAL PARTS BY WEIGHT |
|---|---|
| Perlite | 80 |
| Asbestos | 80 |
| Monoammonium Phosphate | 50 |
| Pentaerythritol | 30 |
| Melamine Formaldehyde Resin* | 200 |

*"Cymel 405" melamine formaldehyde resin produced by American Cyanamid Company.

A release paper was placed on a caul and on top of that paper was placed a 1 foot by 2 foot, 3/16th inch frame. This frame had the desired panel configuration. An amount of the blend sufficient to fill the frame to a depth of 1 inch was then placed on the release paper within the frame and tamped down evenly.

A second release paper was then placed over the frame and a second caul placed on top of that sheet. The composite, filled frame was then placed in a press and heated for 15 minutes at 325° F. under a pressure of 100 psi. After heating, the filled frame was removed from the press and the cured panel removed.

The panel was observed to be rigid and integral. It had a density of about 40 pounds per cubic foot. It could be cut with a saw and nailed into place without need to pre-drill holes for the nails.

EXAMPLE 2

A rigid panel produced in accordance with the method of Example 1 was formed into a composite by application of a 1/28th inch thickness of veneer on each of its two faces with a urea glue. The composite was dried by placing the coated panel in a press for 8 minutes at 300° F. under a pressure of 100 psi.

The resultant, decorative (i.e. veneer coated) wall panel was then tested in accordance with ASTM E-286-68T "Surface Flammability Of Building Materials Using An 8-Foot Tunnel Furnace." The panel successfully passed the test and exhibited a flame spread index of 55.

EXAMPLE 3

A blend of incombustible component and resin was formed in a ribbon blender. The blend had the following composition:

| INGREDIENTS | TOTAL PARTS BY WEIGHT |
|---|---|
| Perlite | 80 |
| Asbestos | 80 |
| Monoammonium Phosphate | 100 |
| Pentaerythritol | 60 |
| Melamine Formaldehyde (Cymel 405) | 200 |

Release paper was placed on caul followed by a sheet of veneer, the upper surface of which was coated with glue. The powdered blend was then spread on top of the glued surface of the veneer and maintained in place by a frame. A second sheet of veneer was then placed on top of the frame. The face of the veneer adjacent the blend was again coated with glue. Finally, a second sheet of release paper was placed over the top surface of the upper sheet of veneer and maintained in place by a second caul.

The entire composite was then placed in a press and cured under the same conditions set forth in Example 1. Upon removal from the press, a low flame spread panel was obtained.

The panel was tested in accordance with ASTM E-286-65T and exhibited a flame spread index of 76. Additionally, its resistance to physical stress (as measured by its modulus of elasticity) was deemed excellent.

EXAMPLE 4

Another wall panel, prepared by the method set forth in Example 3, was formulated in a thickness of 1.5 inches utilizing a blend having the following composition:

| INGREDIENTS | TOTAL PARTS BY WEIGHT |
|---|---|
| Monoammonium Phosphate | 47 |
| Pentaerythritol | 22 |
| Dicyandiamide | 10 |
| Asbestos | 105 |
| Perlite | 405 |
| Melamine Formaldehyde Resin (Cymel 405) | 134 |

The fire-resistant construction material core of this raw material proves essentially impenetrable in its fire-resistance.

We claim:

1. A method for producing a fire-resistant construction material comprising preparing an essentially anhydrous, powdered and homogenously admixed blend comprising at least one incombustible component and from about 30 to 70% by total weight of melamine formaldehyde resin and applying sufficient heat and pressure to cure said resin and transform said blend into a rigid, continuously adherent network having a predetermined construction material configuration.

2. The process of claim 1, wherein the incombustible component is selected from the group consisting of a non-flammable inorganic mineral, an intumescent agent and admixtures thereof.

3. The process of claim 1, wherein the incombustible component is selected from the group consisting of perlite, asbestos, ammonium phosphate, pentaerythritol, dicyandiamide and admixtures thereof.

4. The process of claim 1, wherein the blend comprises up to about 40% by total weight of a non-flammable inorganic mineral, an intumescent agent and from about 30 to about 70% by total weight of melamine formaldehyde resin.

5. The process of claim 4, wherein said blend additionally contains dicyandiamide.

6. A fire-resistant construction panel formed of an anhydrous homogeneously admixed blend of at least one incombustible component bound and cured with melamine formaldehyde resin present in an amount from about 30% to about 70% by total weight of the blend.

7. The fire resistant construction panel as claimed in claim 6 wherein the incombustible component is selected from the group consisting of a non-flammable inorganic mineral, an intumescent agent and admixtures thereof.

8. The fire resistant construction panel as claimed in claim 6 wherein the incombustible component is selected from the group consisting of perlite, asbestos, ammonium phosphate, pentaerythritol, dicyandiamide, and admixtures thereof.

9. The fire resistant construction panel as claimed in claim 6 wherein the admixed blend further comprises up to about 40° by total weight of said incombustible component formed of a non-flammable inorganic mineral and an intumescent agent.

10. The fire resistant construction panel as claimed in claim 9 wherein said construction panel further includes dicyandiamide.

* * * * *